(12) United States Patent
Arie (10) Patent No.: US 8,538,681 B2
(45) Date of Patent: Sep. 17, 2013

(54) NAVIGATION APPARATUS, NAVIGATION METHOD AND PROGRAM

(75) Inventor: Takumi Arie, Kanagawa (JP)

(73) Assignee: Sony Corporation, Tokyo (JP)

( * ) Notice: Subject to any disclaimer, the term of this patent is extended or adjusted under 35 U.S.C. 154(b) by 385 days.

(21) Appl. No.: 12/963,107

(22) Filed: Dec. 8, 2010

(65) Prior Publication Data

US 2011/0184641 A1    Jul. 28, 2011

(30) Foreign Application Priority Data

Jan. 28, 2010    (JP) .................................. 2010-017358

(51) Int. Cl.
*G01C 21/00*    (2006.01)
(52) U.S. Cl.
USPC .......................................................... 701/411
(58) Field of Classification Search
None
See application file for complete search history.

(56) References Cited

U.S. PATENT DOCUMENTS

| 5,410,486 A * | 4/1995 | Kishi et al. ................... 701/437 |
| 2005/0261831 A1* | 11/2005 | Irie .............................. 701/211 |
| 2007/0124068 A1* | 5/2007 | Nakayama et al. ............ 701/210 |
| 2011/0109475 A1* | 5/2011 | Basnayake et al. ........... 340/902 |

FOREIGN PATENT DOCUMENTS

JP    2007-127598    5/2007

* cited by examiner

*Primary Examiner* — Thomas Tarcza
*Assistant Examiner* — Adam Alharbi
(74) *Attorney, Agent, or Firm* — Oblon, Spivak, McClelland, Maier & Neustadt, L.L.P.

(57) ABSTRACT

There is provided a navigation apparatus including a storage unit that stores vehicle lane information for a guidance point, a determination unit that determines a traveling direction of a vehicle, a detection unit that detects whether or not there is the guidance point in the traveling direction of the vehicle, and a decision unit that decides, when it is detected by the detection unit that there are at least two or more guidance points, a priority order of traveling vehicle-lanes at the next guidance point based on vehicle lane information for the two or more guidance points and the traveling direction of the vehicle.

8 Claims, 10 Drawing Sheets

NUMBER OF APPROACH LANES
AT INTERSECTION POINT : 6

NUMBER OF LANES TO ADD　　　NUMBER OF LANES TO ADD
(LEFT) : 1　　　　　　　　　　(RIGHT) : 1

NUMBER OF LANES TO REDUCE　NUMBER OF LANES TO REDUCE
(LEFT) : 0　　　　　　　　　　(RIGHT) : 0

NAVIGATION APPARATUS, NAVIGATION METHOD AND PROGRAM

BACKGROUND OF THE INVENTION

1. Field of the Invention

The present invention relates to a navigation apparatus, a navigation method and a program.

2. Description of the Related Art

As a related art, a navigation apparatus is mounted on a vehicle in motion or the like, by which a current location of a user, a route to a destination, or the like is presented to the user. For example, in providing guidance on a right/left-turn at an intersection point, guidance saying, for example, "Turn right at the next intersection point." is provided before the intersection point. Further, a technique for providing guidance saying "Turn right at the next intersection point. Then, turn left at the next intersection point. Travel in a right-turn lane." with consideration of successive right/left-turns in case of successive right/left-turns at intersection points or in case of successive intersection points or junctions with multiple lanes is disclosed (in JP-A-2007-127598, for example).

SUMMARY OF THE INVENTION

However, in case of successive right/left-turns at intersection points or conjunctions each including multiple lanes, consideration on which lane to take is given only with respect to an upcoming guidance point. Therefore, there was an issue that guidance saying "Travel in a left-turn lane" was provided immediately after a turn has been made at the first intersection point, and therefore a diver was sometimes forced to make an uncomfortable vehicle lane change.

In light of the foregoing, it is desirable to provide a navigation apparatus and a navigation method and a program, which are novel and improved, and which are capable of providing guidance on the optimal lane in case of successive intersection points or junctions each including multiple lanes.

According to an embodiment of the present invention, there is provided a navigation apparatus including a storage unit that stores vehicle lane information for a guidance point, a determination unit that determines a traveling direction of a vehicle, a detection unit that detects whether or not there is the guidance point in the traveling direction of the vehicle, and a decision unit that decides, when it is detected by the detection unit that there are at least two or more guidance points, a priority order of traveling vehicle-lanes at the next guidance point based on vehicle lane information for the two or more guidance points and the traveling direction of the vehicle.

The detection unit may detect a first guidance point that is a guidance point in the traveling direction of the vehicle and a second guidance point that is a farther guidance point in the traveling direction of the vehicle. The decision unit may decide, when the first guidance point and the second guidance point are detected by the detection unit, a priority order of traveling vehicle-lanes at the first guidance point based on vehicle lane information for the first guidance point and vehicle lane information for the second guidance point.

The detection unit may detect that a distance between the first guidance point and the second guidance point is less than or equal to a predetermined threshold.

The storage unit may store right/left-turn information for each vehicle lane at a guidance point.

The left/right-turn information for each vehicle lane may be expressed by bit width of the number of vehicle lanes. The decision unit may decide a priority order of traveling vehicle-lanes at a first guidance point that is a guidance point in the traveling direction of the vehicle, by logical conjunction of a bit value for the first guidance point and a bit value for a second guidance point that is a farther guidance point in the traveling direction of the vehicle.

Vehicle lane addition/reduction information indicating addition/reduction of a vehicle lane in an interval from a first guidance point that is a guidance point in the traveling direction of the vehicle to a second guidance point that is a farther guidance point in the traveling direction of the vehicle may be stored in the store unit. The decision unit may decide a priority order of traveling vehicle-lanes at the first guidance point, based on the vehicle lane addition/reduction information, and vehicle lane information for the first guidance point and vehicle lane information for the second guidance point.

The navigation apparatus may further include a guidance unit that provides guidance on the priority order of the traveling vehicle-lanes, decided by the decision unit, before the next guidance point is passed.

The guidance unit may display an arrow indicating the traveling direction of the vehicle on the traveling vehicle-lane which is displayed on a display screen, and may change the arrow indicating the traveling direction in accordance with the priority order of the traveling vehicle-lanes, decided by the decision unit.

Multiple traveling vehicle-lanes may be displayed on the display screen. The guidance unit may display arrows each indicating the traveling direction of the vehicle on the multiple traveling vehicle-lanes displayed on the display screen, and may display an arrow displayed on a traveling vehicle-lane with a high priority, decided by the decision unit, in a more accentuated manner than an allow for another traveling vehicle-lane.

According to another embodiment of the present invention, there is provided a program for causing a computer to function as a navigation apparatus including a storage unit that stores vehicle lane information for a guidance point, a determination unit that determines a traveling direction of a vehicle, a detection unit that detects whether or not there is the guidance point in the traveling direction of the vehicle, and a decision unit that decides, when it is detected by the detection unit that there are at least two or more guidance points, a priority order of traveling vehicle-lanes at the next guidance point based on vehicle lane information for the two or more guidance points and the traveling direction of the vehicle.

According to another embodiment of the present invention, there is provided a navigation method, including the steps of determining a traveling direction of a vehicle, detecting a guidance point in the traveling direction of the vehicle, and deciding, when it is detected that there are at least two or more guidance points, a priority order of traveling vehicle-lanes at the next guidance point based on vehicle lane information for the two or more guidance points and the traveling direction of the vehicle.

According to the embodiments of the present invention described above, it is possible to provide guidance on the optimal lane in case of successive intersection points or junctions each including multiple lanes.

DETAILED DESCRIPTION OF THE EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The "detailed description of the embodiments" will be described in the following order.

<1. Object of the present embodiment>
<2. Outline of the present embodiment>
<3. Hardware Configuration of PND>
<4. Functional Configuration of PND>
<5. Detail of Operation of PND>

<1. Object of the Present Embodiment>

First, the object of the present embodiment will be explained. As a related art, a navigation apparatus is mounted on a vehicle in motion or the like, by which a current location of a user, a route to a destination, or the like is presented to the user. For example, in providing guidance on a right/left turn at an intersection point, guidance saying, for example, "Turn right at the next intersection point." is provided before the intersection point.

Further, in case of a right/left turn at an intersection point or when a road diverges right and left at a junction, a right-turn-only lane or a left-turn-only lane sometimes needs be taken. By watching a traffic sign/mark, a driver enters a lane leading into a direction where the driver wants to go to, or makes a right/left turn, or drives into a branch direction. However, because only information on the corresponding intersection point or the corresponding junction is written in the traffic sign/mark, every time an intersection point or a junction is entered, switch of a vehicle lane to a lane of a target direction is to be made after instantaneous decision at the sight of the traffic sign/mark. As just described, in case of successive vehicle lane changes, the driver needs to be very careful about which lane to take, and the driver not only gets stressed about it, but also it is very dangerous because the driver sometimes needs to make an uncomfortable vehicle lane change.

In a navigation system of the related art, guidance saying "Turn right at the next intersection point. Then, turn left at the next intersection point. Travel in a right-turn lane." with consideration of successive right/left-turns in case of successive right/left-turns at intersection points or in case of successive intersection points or junctions each including multiple lanes is provided. However, in case of successive right/left-turns at intersection points or junctions each including multiple lanes, consideration on which lane to take is given only with respect to an upcoming guidance point. Therefore, there was an issue that guidance saying "Travel in a left-turn lane" was provided immediately after a turn has been made at the first intersection point, and therefore a diver was sometimes forced to make an uncomfortable vehicle lane change.

In light of the foregoing, a navigation apparatus according to an embodiment of the present invention is created. With the navigation apparatus according to the present embodiment, it becomes possible to provide guidance on the optimal lane in case of successive intersection points or junctions each including multiple lanes.

<2. Outline of Present Embodiment>

Figure 1:
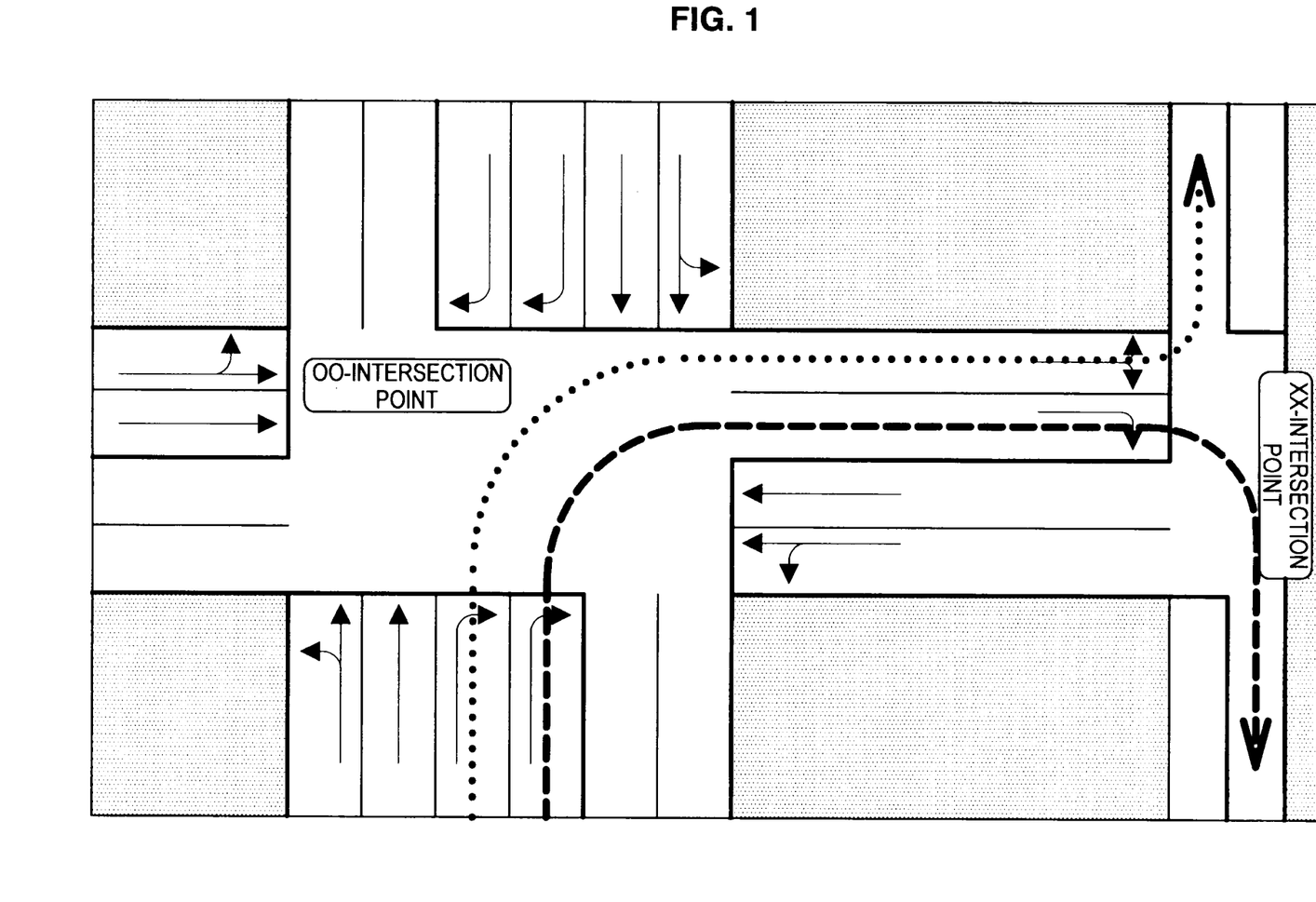
FIG. 1 is an explanatory diagram illustrating an outline of an embodiment of the present invention.

In the above, the object of the present embodiment has been explained. Next, an outline of the present embodiment will be explained with reference to FIG. 1. FIG. 1 is an explanatory diagram illustrating the outline of the present embodiment. A user of a navigation apparatus causes the navigation apparatus, after setting a destination or a via-point, to perform route search and to start guidance to the destination. The navigation apparatus indicates on a display a route to be traveled. Further, when it comes close to a spot where a right/left turn at an intersection point or the like is to be made, guidance is provided such as voice guidance saying, for example, "Turn right at the OO-intersection point." and guidance on a map, in which, for example, a turning direction is indicated on a screen with an arrow. Hereafter, a spot where a right/left-turn at an intersection point is to be made is also referred as to a guidance point.

Furthermore, when a guidance point includes multiple lanes, the navigation apparatus provides more detailed guidance, by using turn information for the guidance point, with audio guidance saying, for example, "Turn right at the OO-intersection point. Travel in a right vehicle lane", or with screen display indicating, for example, which lane to take.

The navigation apparatus provides guidance on the next guidance point in principle. However, when a distance between the next guidance point and a guidance point after the next guidance point is short, in providing guidance on the next guidance point, guidance on the guidance point after the next guidance point saying, for example, "Turn right at the OO-intersection point. Then, turn left at the XX-intersection point." is also provided. This is because, in a case where a distance between the next guidance point and the guidance point after the next guidance point is short, if guidance on the guidance point after the next guidance point is provided after the guidance on the next guidance has been terminated, the guidance comes too late.

Next, appropriate guidance in case of successive intersection points each including multiple lanes will be explained. For example, as shown in FIG. 1, a case of traveling a route A in which a right turn is to made at the OO-intersection point and a left turn is to be made at the XX-intersection point will be explained. When traveling the route A, by taking the right-turn lane on the left side of two right-turn lanes at the first guidance point, it is possible to make an easy left-turn at a guidance point after the next guidance point. The navigation apparatus calculates the optimal traveling lane by using turn information for each intersection point, and provides, before the next guidance point, guidance saying, for example, "Turn right at the OO-intersection point. Then, turn left at the XX-intersection point. Travel in a lane second from the right." with consideration of also the guidance point after the next guidance point. Thereby, it becomes possible for a driver to safely travel in a road according to the route, without getting upset.

<3. Hardware Configuration of PND>

In the above, the outline of the present embodiment has been explained. Next, a hardware configuration of the navigation apparatus will be explained with reference to FIG. 2. Hereafter, explanation will be made by applying the navigation apparatus to a Personal Navigation Device (PND) 100 shown in FIG. 2.

[3-1] Hardware Configuration of PND

Figure 2:
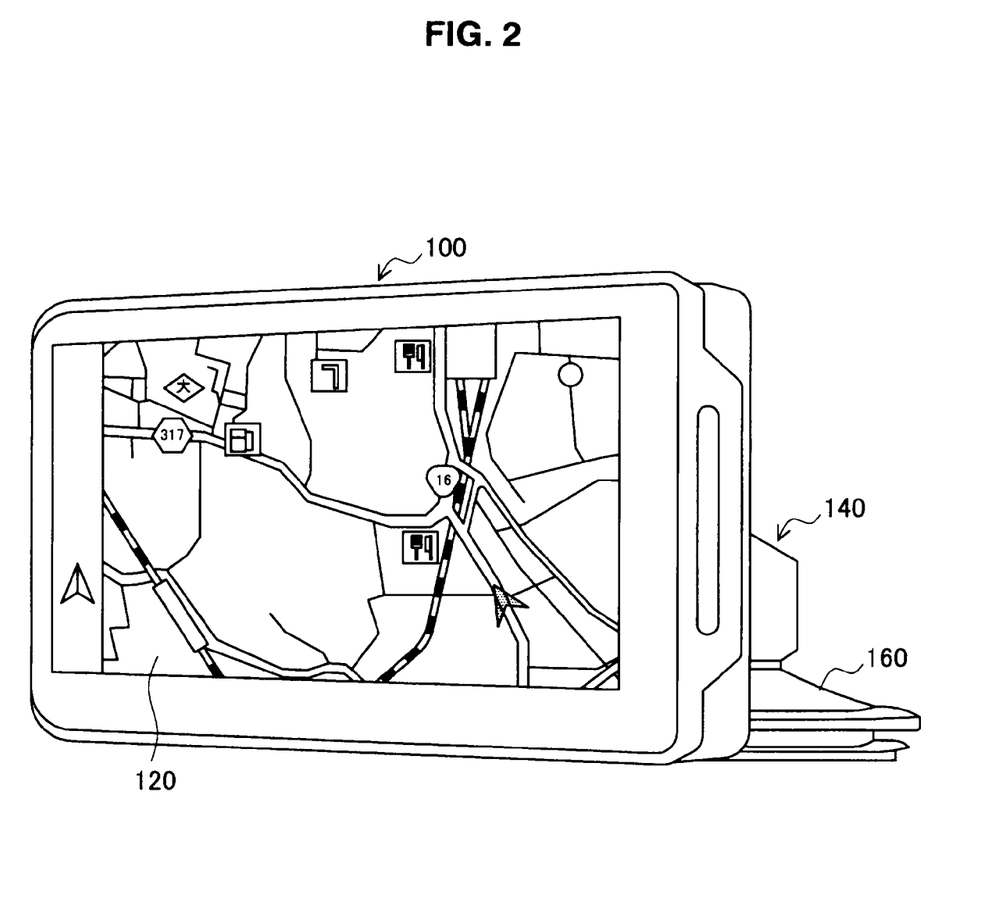
FIG. 2 is an appearance view of a PND according to the embodiment.

As shown in FIG. 2, a display unit 120 of the PND 100 is provided at the front of the apparatus. The PND 100 performs navigation by displaying on the display unit 120 an actual image or the like in accordance with map data stored in an embedded non-volatile memory (not shown). Further, the PND 100 may be provided with a cradle 140 and a suction cup 160. The cradle 140 and the suction cup 160 are used, when the PND 100 is used in a vehicle, in order to mount the PND 100 onto a dashboard of the vehicle. The PND 100 is mounted via the suction cup 160 on the dashboard of the vehicle and is mechanically and electrically connected to a vehicle. The PND 100 can operate on electric power fed via the cradle 140 from the vehicle.

Further, in the present embodiment, a case where the PND 100 is mounted on a vehicle will be explained, but examples are not limited thereto. The PND 100 may be used in traveling on foot or by bicycle. When a user uses the PND 100 in traveling on foot, the PND 100 does not have to include the cradle 140 and the suction cup 160. When a user uses the PND 100 in traveling on foot, the user carries only the PND 100 itself. Further, when the user uses the PND 100 in traveling by bicycle, the user may carry only the PND 100 itself in a manner similar to the way when traveling on foot, or may carry it with the cradle 140 and the suction cup 160 mounted on the handlebar of the bicycle.

Furthermore, it may be that a desired navigation mode is selected among from multiple navigation modes by pushing a navigation mode switch button (not shown) of the PND 100. For example, operation for selecting a vehicle-mode is to be performed when the PND 100 is used in a vehicle, and operation for selecting a bicycle-mode is to be performed and when the PND 100 is used on a bicycle, and operation for selecting a on-foot mode is to be performed when the PND 100 is used in travel on foot.

When a user's desired navigation mode is selected by user operation, the PND 100 performs navigation in the selected navigation mode. Because the PND 100 has a function of acquiring a current location, the PND 100 displays on the display unit 120 a map including the current location, and performs navigation while superimposing the current location or a moving direction of the user on the displayed map.

<4. Functional Configuration of PND>

Figure 3:
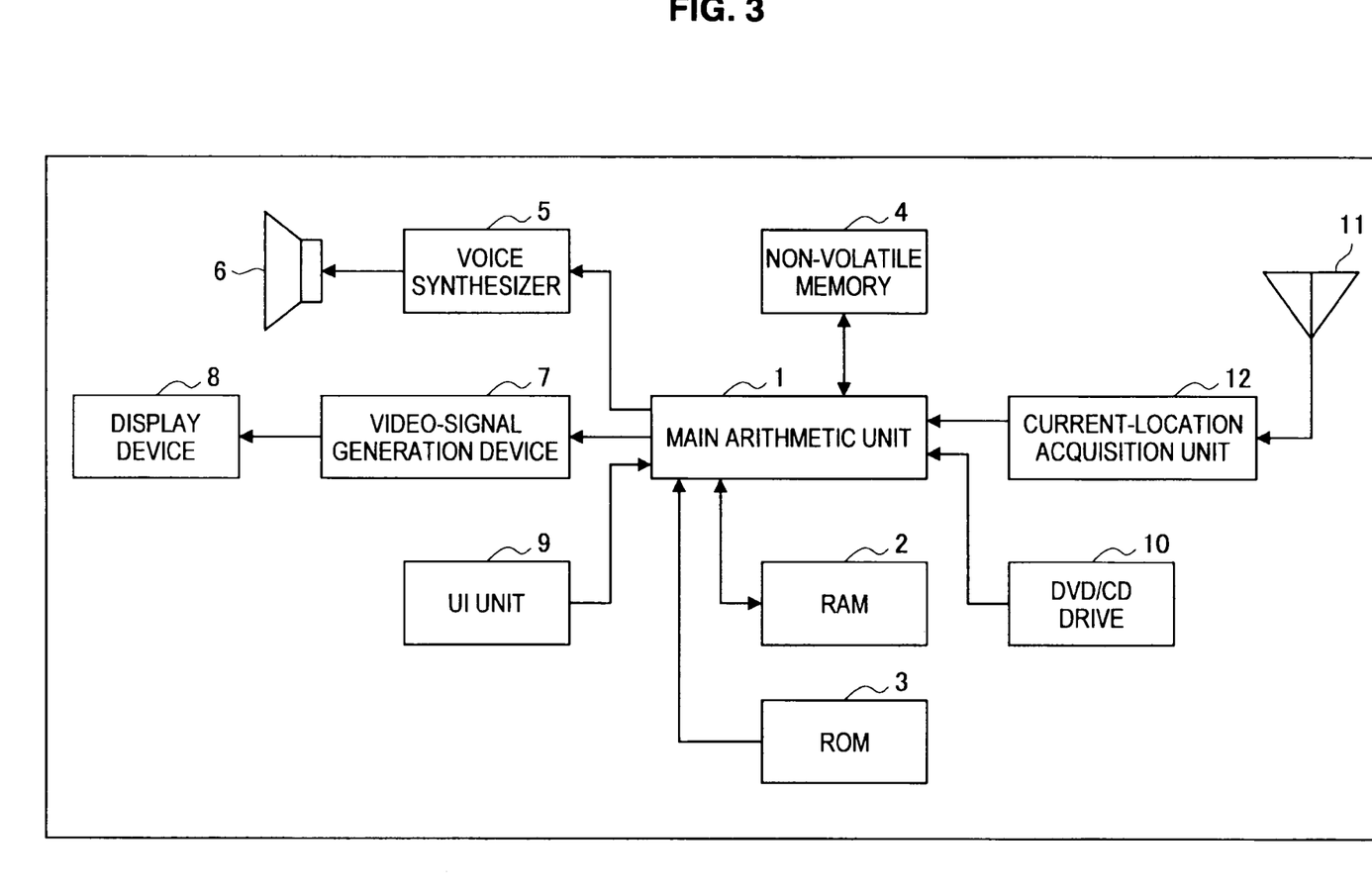
FIG. 3 is a block diagram showing a functional configuration of the PND according to the embodiment.

In the above, the hardware configuration of the PND 100 has been explained. Next, a functional configuration of the PND 100 will be explained with reference to FIG. 3. As shown in FIG. 3, the PND 100 includes a main arithmetic unit 1, a Random Access Memory (RAM) 2, a Read Only Memory (ROM) 3, a non-volatile memory 4, a voice synthesizer 5, a speaker 6, a video-signal generation device 7, a display device 8, a sensor 11, a current-location acquisition device 12, and the like.

The main arithmetic unit 1 is, for example, a Central Processing Unit (CPU), or the like, and performs arithmetic processing of data or performs control over a system. Programs, data which does not have to be rewritten, or the like is stored in the RAM 3. And transient data of arithmetic processing, or the like is recorded in the RAM 2.

The non-volatile memory 4 is, for example, a HDD, a flash memory, a memory card and the like, and has map data necessary for map depiction, destination search, route search, and guidance recorded therein. Further, the map data may be recorded in a DVD/CD drive 10. When each intersection point or each junction includes multiple lanes, the map data holds turn information indicating into which direction each lane can lead. Turn information for an intersection point will be described later. The non-volatile memory 4 is an example of a storage unit for the present embodiment.

The voice synthesizer 5 generates guidance voice, and the speaker 6 outputs the guidance voice generated by the voice synthesizer 5. The video-signal generation device 7 generates a video signal for displaying a map or a traveling route. The display device 8 displays video generated by the video-signal generation device 7.

Further, an UI unit 9 may represent an operation button, a touch panel, a touch screen, or the like, and has a function of accepting user operation. Examples of detailed user operation include, for example, destination setting, scaling of a map, display of a current location, voice guidance setting, screen display setting, and the like.

A sensor 11 may represent various kinds of sensors such as a GPS, speed pulse, and an angular velocity sensor. The GPS calculates a location of each satellite from orbit information included in each GPS signal. And a GPS processing unit 114 calculates a current three-dimensional location by simultaneous equations, based on the location of each satellite and on a difference between transmission time and reception time of a GPS signal. When the current location can not be calculated by the GPS, the current location is acquired by use of an angular velocity sensor or the like.

The current-location acquisition device 12 has function of acquiring information on the current location calculated by the sensor 11. As described above, when location information on the current location could be calculated by the GPS, the corresponding location information is acquired. Further, variation amount from the location obtained in the previous calculation to the current location is derived based on a velocity with regard to a driving direction V and on a turning angle θ, by use of an angular velocity sensor or the like. The current location is then acquired by adding the above variation amount to the location obtained in the previous calculation.

Besides, a method of acquiring a current location or the like does not limited to the GPS positioning or the above method using a sensor. For example, it is also possible to acquire a current location by the use of signal intensity of Wi-Fi waves transmitted by a base station of a wireless LAN. More specifically, the PND 100 may estimate a distance to each base station from the received intensity of Wi-Fi waves from each base station, and may acquire a current location based on principles of triangulation, using the distance to each base station and a location of each base station.

Figure 4:
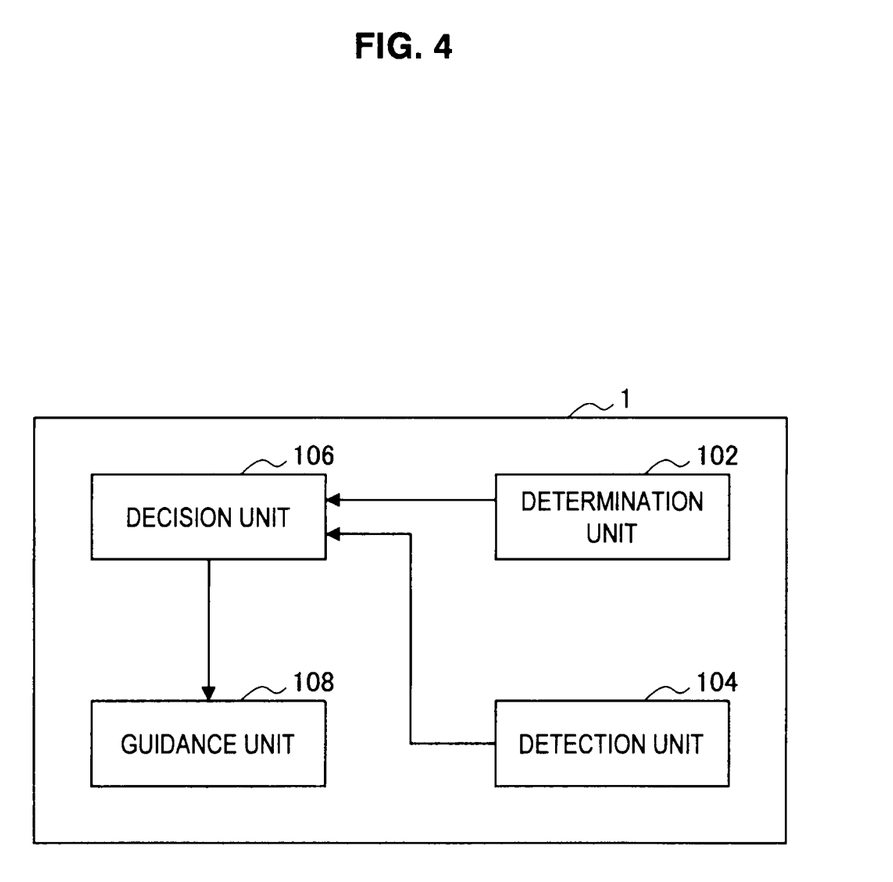
FIG. 4 is a block diagram showing a detail of a functional configuration of an arithmetic unit 1 according to the embodiment.

Next, a detail of a functional configuration of the main arithmetic unit 1 will be explained with reference to FIG. 4. FIG. 4 is a block diagram showing the detail of the functional configuration of the arithmetic unit 1. As shown in FIG. 4, the main arithmetic unit 1 includes a determination unit 102, a detection unit 104, a decision unit 106, a guidance unit 108, and the like. The determination unit 102 has a function of determining a traveling direction of a vehicle. Information relating the traveling direction of the vehicle, which was determined by the determination unit 102, is fed to the decision unit 106.

The detection unit 104 has a function of detecting whether or not there is a guidance point in a traveling direction of a vehicle. The guidance point is, as described above, a point where a right/left turn at an intersection point is to be made on a route to a destination. Further, the detection unit 104 detects the next guidance point for a destination (a first guidance point) and a guidance point after the next guidance point for a destination (a second guidance point). Information for the guidance points detected by the detection unit 104 is fed to the decision unit 106.

The decision unit 106 has a function of deciding, when it is detected by the detection unit 104 that there are at least two or more guidance points, a priority order of traveling vehicle-lanes at the next guidance point, based on traveling vehicle lane information for the two or more guidance points and on the traveling direction of the vehicle. As described above, when a next guidance point and a guidance point after the next guidance point for a destination are detected, the priority order of the traveling vehicle-lanes at the first guidance point is decided based on the traveling vehicle lane information for the first guidance point and the traveling vehicle lane information for the second guidance point.

Further, as described above, when each intersection point or each junction includes multiple lanes, turn information indicating into which direction each lane can lead (right/left-turn information) is held in the non-volatile memory 4. The right/left information for each vehicle lane is expressed by bit width of the number of vehicle lanes. The decision unit 106 decides a priority order of traveling vehicle-lanes at the first guidance point by logical conjunction of a bit value for the first guidance point and a bit value for the second guidance point.

Figure 5:
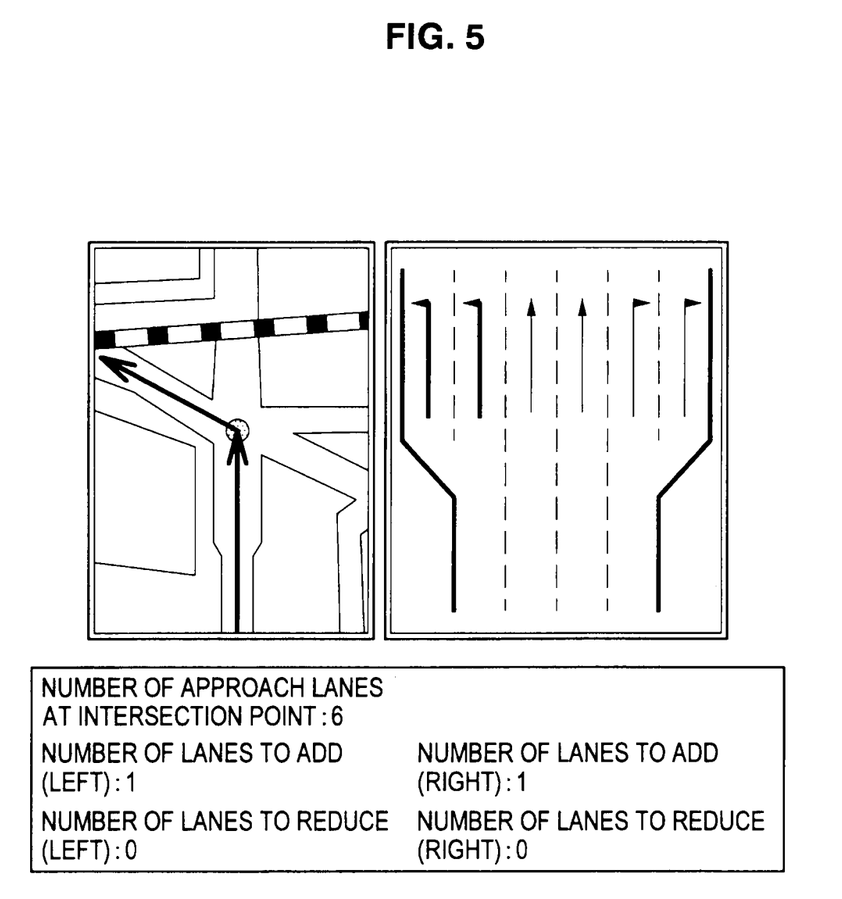
FIG. 5 is an explanatory diagram illustrating right/left-turn information for a vehicle lane and vehicle lane addition/reduction information according to the embodiment.

Further, vehicle lane addition/reduction information indicating addition/reduction of a vehicle lane in an interval from the first guidance point to the second guidance point is held in the non-volatile memory 4. The decision unit 106 decides a priority order of traveling vehicle-lanes at a guidance point, based on the vehicle lane addition/reduction information, and vehicle lane information for the first guidance point and vehicle lane information for the second guidance point. Now, right/left-turn information for a vehicle and lane vehicle lane addition/reduction information, which are held for each guidance point, will be explained with reference to FIG. 5. FIG. 5 is an explanatory diagram illustrating the right/left-turn information for a vehicle lane and the vehicle lane addition/reduction information.

As shown in FIG. 5, as information for each intersection point, the numbers of approach lanes, lanes to add, lanes to reduce, and the like at the intersection point are held. Further, information indicating which lane of approach lanes at the intersection point is a right-turn-only lane, a through-traffic lane, or a left-turn-only lane is also held. For example, a case will be explained where the number of lanes is four and information for each lane is held by the bit width of four bits. Because it is possible to drive into three directions, namely, a straight direction, a left-turn direction or a right-turn direction, three regions of 4-bit-width are used. A lane which can lead into each driving direction is set as "1" and a lane which can not lead into each driving direction is set as "0".

For example, in FIG. 1, when a vehicle enters the OO-intersection point from the bottom of the figure, through-traffic information is "1100", left-turn information is "1000", and right-turn information is "0011". In the same manner, when a vehicle enters the XX-intersection point from the OO-intersection point, turn information for the XX-intersection is "10" with respect to left-turn information, and "11" with respect to right-turn information. Because there is no through-traffic lane at the XX-intersection point, through-traffic information is not held.

By using such turn information for each intersection point, in case of two successive intersection points, it is possible to calculate the optimal lane at the first intersection point. Specifically, it becomes possible to calculate the optimal traveling lane at the first intersection point, by performing logical conjunction of the turn information for the first intersection point and the turn information for the next intersection point.

In traveling the route A of FIG. 1, it is easier for a vehicle to enter, from the right-turn lane on the left side rather than on the right side of two right-turn lanes at the OO-intersection point, the left-turn lane at the next XX-intersection point. Therefore, the optimal traveling lane is the right-turn lane on the left side of the two right-turn lanes at the OO-intersection point. When bit information described above is used, the optimal traveling lane can be calculated in the following manner.

First, it is found from the right-turn information of the OO-intersection point, "0011", that two lanes on the right permit a right turn. Then, the bit value "11" for the lanes permitting a right turn is taken. Because the left-turn information of the XX-intersection point is "10", when the logical conjunction of "11" and "10" is performed, computing result is "10". Thereby, it is found that, in traveling the route A, the optimal traveling lane at the OO-intersection point is the right-turn lane on the left side of the right-turn lanes.

Here, it also seems that guidance on the optimal lane could be more easily provided in such a manner that a lane on the side of the turning direction at an intersection point after the next intersection point, that is, a lane on the left when a left turn is made at the point, or a lane on the right when a right turn is made at the point, is presented as the optimal lane. However, when traveling a route B of FIG. 1, both of two right-turn lanes are optimal lanes, because both of two vehicle lanes at the XX intersection point permit a right turn. Therefore, if the lane on the side of the turning direction at an intersection point after the next intersection point is set as the optimal lane, appropriate guidance may not be provided when traveling the route B.

However, also when a route B is traveled by using the method according to the present embodiment, appropriate guidance can be provided. Specifically, when logical conjunction of "11", which was taken form the right-turn information for the OO-intersection point "0011", and the right-turn information for the XX-intersection point "11" is performed, computing result is "11". Therefore, it can be calculated that, when traveling the route B, either one of right-turn lanes at the OO intersection point is optimal lane.

In FIG. 1, a case where, at the first guidance point, the number of lanes which can lead to the next guidance point is equal to the number of lanes at the next guidance point has been explained. Next, a case where the numbers of lanes are mismatched will be explained with reference to FIG. 6. First, it is assumed that, at the first guidance point P1, the number of lanes which can lead to the next guidance point P2 is m and the number of lanes at P2 is n. Further, it is assumed that, after P1 has been passed, the number of lanes does not increase/decrease until it arrives to the next guidance point P2. In case of m<n, if a left turn is made, turn information of P1 and turn information of P2 are compared with reference to the leftmost vehicle lanes of P1 and P2; if a right turn is made, turn information of P1 and turn information of P2 are compared with reference to the rightmost vehicle lanes of P1 and P2.

Figure 6:
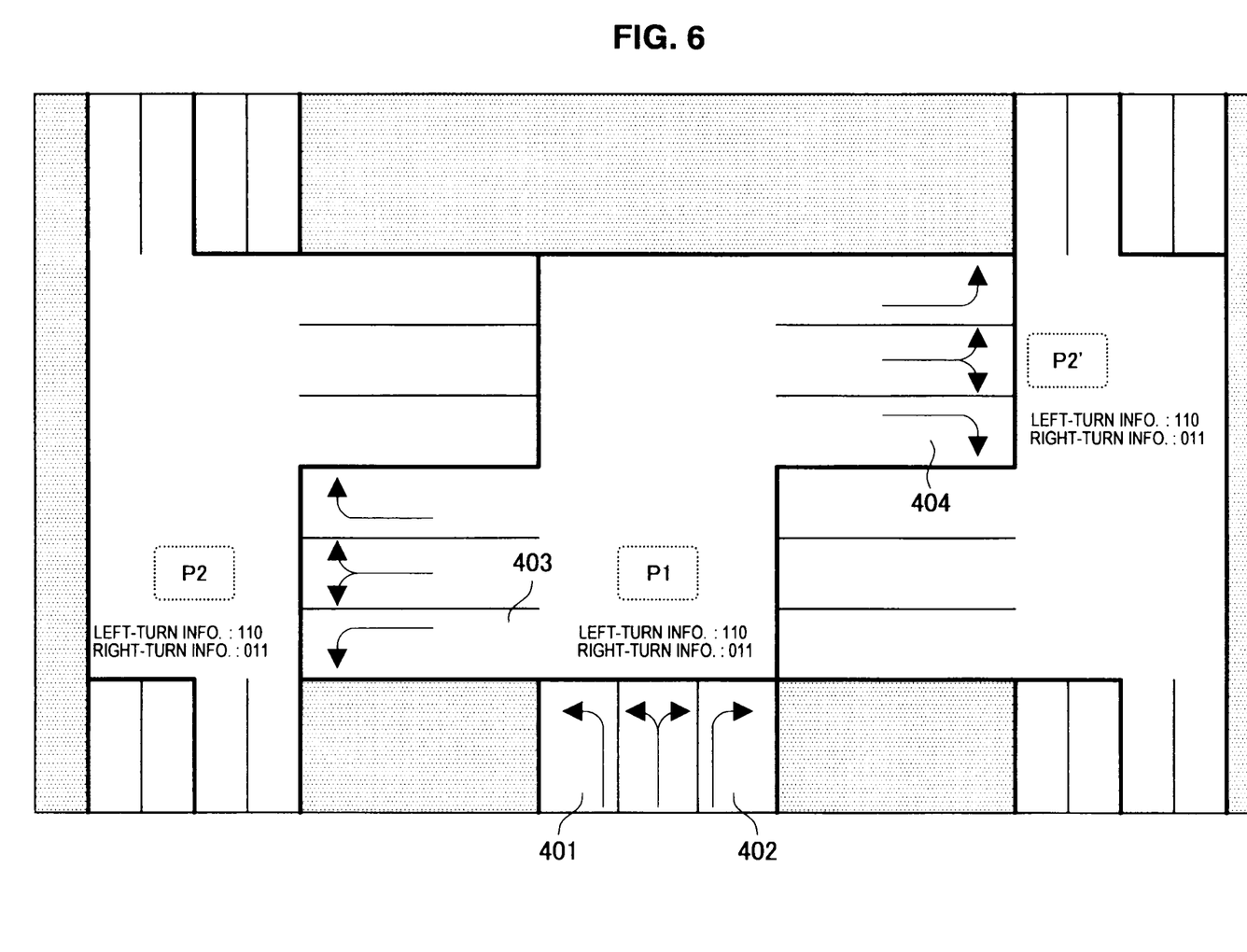
FIG. 6 is an explanatory diagram illustrating a case where the numbers of lanes are mismatched according to the embodiment.

For example, in case where a left turn is to be made at the guidance point P1 and a right turn is to be made at P2, m=2, n=3, and right-turn information of P2 is "011", then turn information of P1 and P2 are compared with reference to the leftmost sides, namely, the MSB (Most Significant Bit) sides. Specifically, the left-turn information for the intersection point P1, "11", is rewritten as "110" to be compared with the right-turn information for the intersection point P2, "011". Logical conjunction of the left-turn information for the intersection point P1, "110", and the right-turn information for the intersection point P2, "011", is "010". Therefore, it is found that the left-turn vehicle lane on the rightmost side is optimal at the intersection point P1.

Further, a case of the right-turn information for the intersection point P2, "001", may be also assumed. In such a case, comparison between the turn information of P1 and the turn information of P2 according to the above method results in "000". When the comparison result is "000", guidance on the vehicle lane closest to the turning direction at the intersection point P2, namely, the rightmost left-turn vehicle lane may be provided.

Further, the optimal lane can be calculated in the same manner as the described above, also when a right turn is to be made at the intersection point P1 and a left turn is to be made at the intersection point P2'. The right-turn information for the intersection point P1 is "11" and the left-turn information for the intersection point P2' is "110". In such a case, comparison is made with reference to the rightmost lanes of P1 and P2', namely, the LSB (Least Significant Bit) sides. Specifically, the right-turn information for the intersection point P1 is rewritten as "011", and when logical conjunction of the right-turn information of P1, "011", and the left-turn information of P2', "110", is performed, computing result is "010". Thereby, it is found that the right-turn lane on the left side at the intersection point P1 is optimal.

Besides, as to the case of m>n, the corresponding structure of a road is dangerous and does not exist in reality, and therefore, the corresponding case does not have to be considered.

Figure 7:
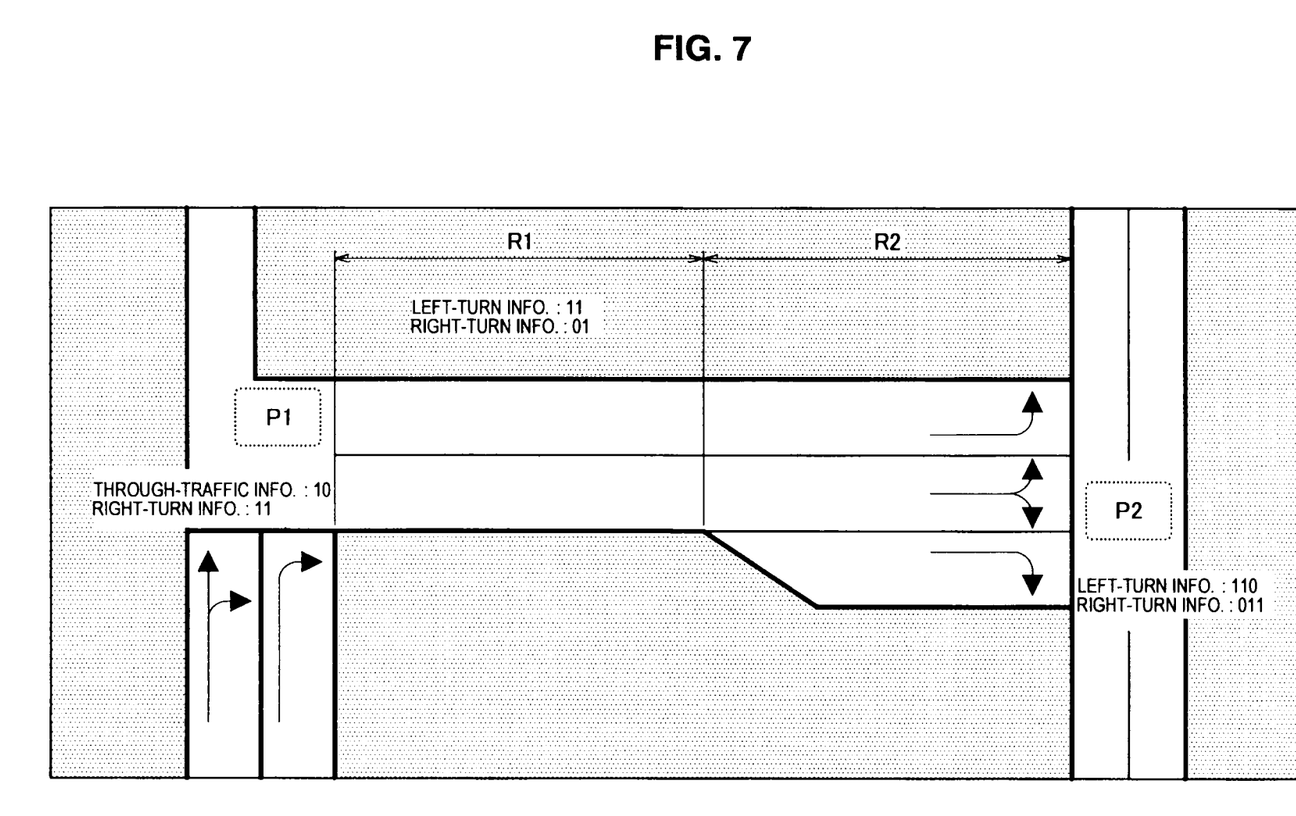
FIG. 7 is an explanatory diagram illustrating a case where the number of lanes increases/decreases along the way according to the embodiment.
Figure 8:
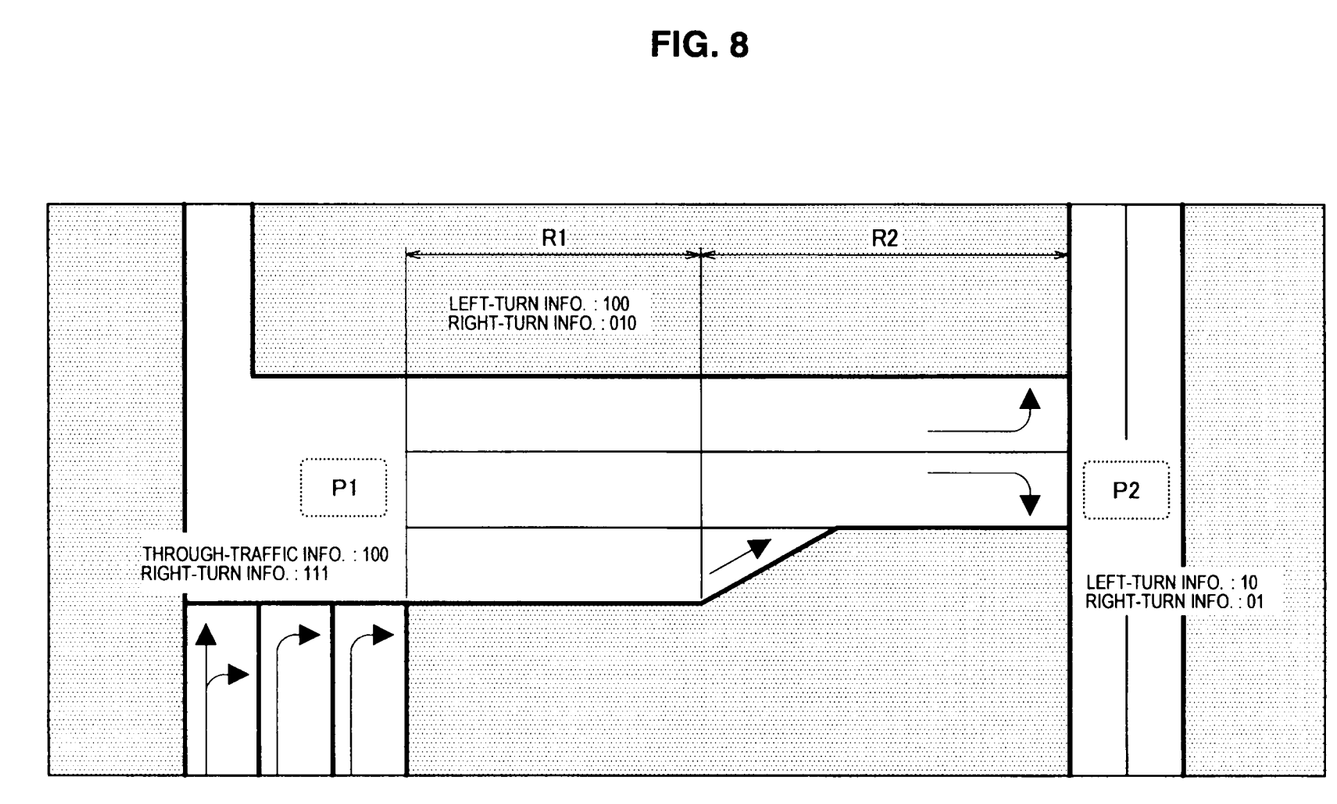
FIG. 8 is an explanatory diagram illustrating a case where the number of lanes increases/decreases along the way according to the embodiment.

Next, a case where the number of lanes increases/decreases along the way will be explained with reference to FIGS. 7 and 8. FIGS. 7 and 8 are each an explanatory diagram illustrating a case where the number of lanes increases/decreases. As shown in FIG. 7, when, after the intersection point P1 has been passed, the number of lanes of the road to P2 increases/decreases, the road information is separately managed at the point where the number of lanes changes. First, the road before the point where the number of lanes changes is set as R1 and the road after the point where the number of lanes has changed is set as R2. Then, turn information with consideration of the turn information of R2 is provided for R1 to be compared with the turn information for the intersection point P1.

First, a case where the number of lanes of R1 is n1 and the number of lanes of R2 is n2, n1<n2 will be explained. As shown in FIG. 7, it is assumed that the number n1 of lanes of R1=2, and the number n2 of lanes of R2=3. Further, it is assumed that a lane on the right side is added in R2, and the left-turn information of R2 is "110" and the right-turn information is "011". Here, the turn information of R1 is as follows. The right-turn lane of R2 can be entered only from the lane on the right side of R1, and therefore, the right-turn information of R1 is set as "01". On the other hand, the left-turn lane of R2 can be entered from both lanes of R1, and therefore, the left-turn information is "11".

A route in which, after a right turn has been made at the intersection point P1, a right turn is to be made at the intersection point P2 will be considered. In such a case, when the right-turn information of P1 is "11", the logical conjunction of the right-turn information of P1, "11", and the right-turn information of R1, "01", results in "01". Therefore, it can be calculated that the right-turn lane on the right side is optimal at the intersection point P1.

In the same manner, a route in which, after a right turn has been made at the intersection point P1, a left turn is to be made at the intersection point P2 will be explained. In such a case, logical conjunction of the right-turn information of the intersection point P1, "11", and the left-turn information of R1, "11", results in "11". It is found that both of the right-turn lanes of the intersection point P1 are optimal.

Next, a case where the number of lanes decreases, namely, a case where the number n1 of lanes of R1>the number n2 of lanes of R2 will be explained. As showed in FIG. 8, it is assumed that the number n1 of lanes of R1=3, and the number n2 of lanes of R2=2. Further, it is assumed that the rightmost vehicle lane of R1 ends in R2, and the left-turn information of R2 is "10" while the right-turn information is "01". In such a case, with regard to the turn information of R1, the left-turn information is "100" while the right-turn information is "010". Further, when the turn information of the intersection point P1 is "111", the logical conjunction is "100" in case of a left turn at the intersection point P2 or "010" in case of a right turn at the intersection point P2. Therefore, it is found that the optimal lane at P1 is the leftmost lane in case of a left turn at the intersection point P2 or the lane in the middle in case of a right turn at the intersection point 2.

As described above, with the navigation apparatus according to the present embodiment, it becomes possible to calculate optimal traveling lane at the next guidance point in accordance with conditions of lanes at a guidance point after the next guidance point.

Returning to FIG. 4, explanation of the functional configuration of the main arithmetic unit 1 will be proceeded with. The guidance unit 108 has function of providing guidance on a priority order of traveling vehicle-lanes, which was decided by the decision unit 106, before the next guidance point is passed. The guidance unit 108 displays an arrow indicating a traveling direction of a vehicle on a traveling vehicle-lane displayed on the display screen of the display device 8, and changes the arrow indicating the traveling direction according to the priority order of the traveling vehicle-lanes, which was decided by the decision unit 106.

Further, the guidance unit 108 displays arrows each indicating the traveling direction of the vehicle on multiple traveling vehicle-lanes displayed on the display screen of the display device 8. Furthermore, the guidance unit 108 displays a arrow displayed on a traveling vehicle-lane with a high priority, which was decided by the decision unit 106, in a more accentuated manner than an allow for another traveling vehicle-lane.

Figure 9:
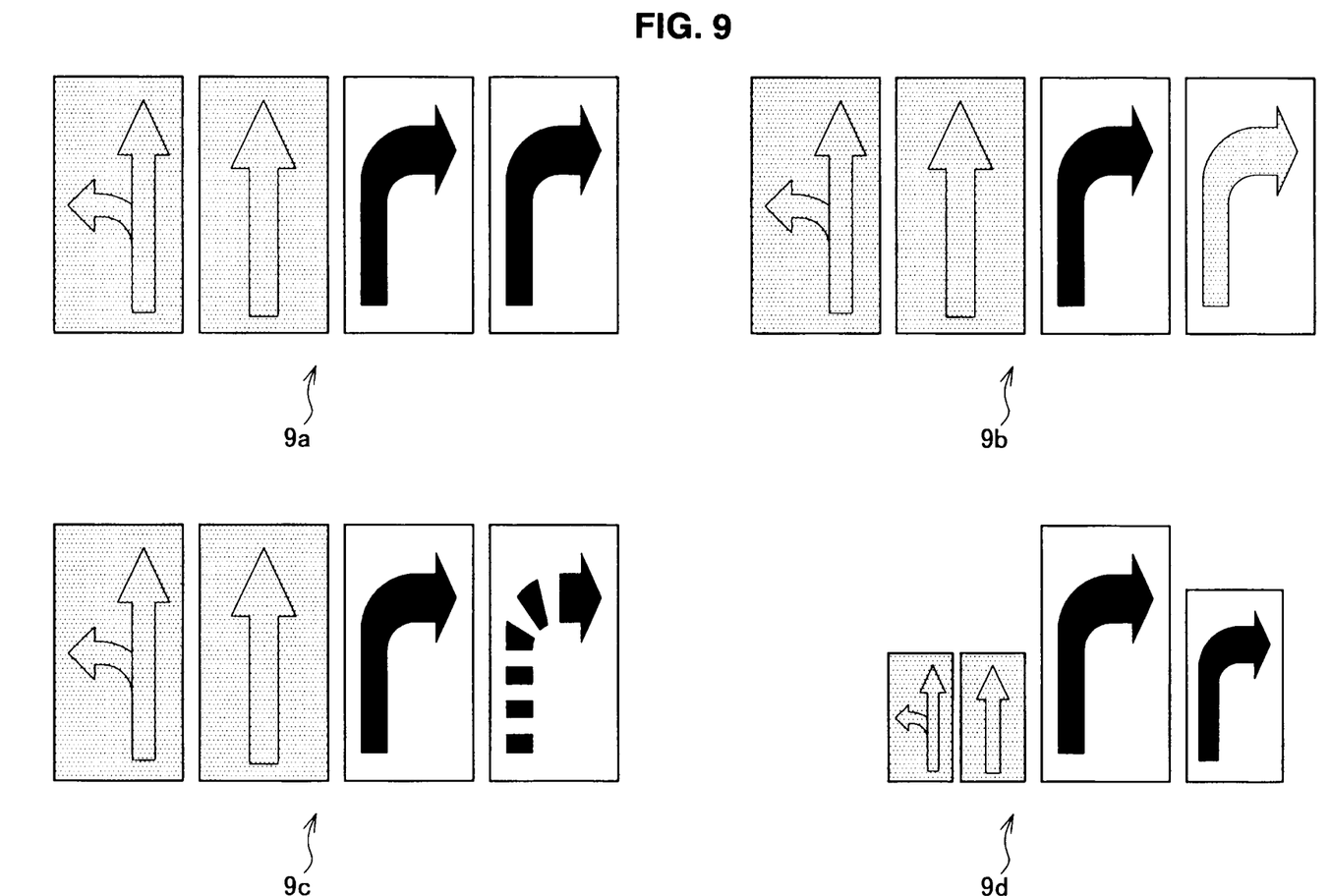
FIG. 9 is an explanatory diagram illustrating a method of providing guidance on optimal traveling lane according the embodiment.

Here, a method of providing guidance on optimal traveling lane by the guidance unit 108 will be explained with reference to FIG. 9. FIG. 9 is an explanatory diagram illustrating the method of providing guidance on optimal traveling lane.

By providing, with displays showed in FIG. 9, guidance on optimal traveling lane calculated according to the method above, the guidance on optimal traveling lane is provided in a way that is understandable to a driver and it becomes possible to more safely travel. For example, when traveling the route A of FIG. 1, in a navigation system of the related art, guidance only for causing a vehicle to turn right was provided at the OO-intersection point. Therefore, as shown in FIG. 9a, images for turn information in which both of right-turn lanes are highlighted are displayed in order to guide a driver to travel in either one of the right lanes.

On the other hand, when guidance on the route A is provided, in guidance at the first OO-intersection point, a vehicle may travel in both of the right-turn lanes, but it is more suitable to travel in the right-turn lane on the left. In this case, as shown in FIG. 4b, the arrow on the right-turn lane on the left side is thickly depicted, while an arrow on the right-turn lane on the right side is thinly depicted. Thereby, the arrow on the left right-turn lane of two right-turn lanes is accentuated, and it can be indicated that the left right-turn lane is more suitable than the right right-turn lane.

In this manner, an optimal traveling lane is accentuated and another traveling lane which may be traveled is secondarily accentuated, while a traveling lane which may not be traveled is inconspicuously displayed. Thereby, it becomes possible to indicate, in a way that is understandable to a user, which lane is optimal, or which lane to take for travel on a correct route. As to display in which arrows are gradually accentuated, in addition to a method of expressing using shades of the color, as showed in FIG. 9c, an arrow of an optimal traveling lane may be depicted as a solid line while a second optimal traveling lane may be depicted as a dashed line.

Further, as shown in FIG. 4d, it may be that the optimal traveling lane is largely displayed and the second optimal traveling lane is displayed in a normal size and the traveling lane which may not be traveled is small displayed. Furthermore, by combining the display methods according to a to d of FIG. 4 with each other, a more large difference between displays of the optimal traveling lane, the traveling lane which may be traveled, and the traveling lane which may not be traveled may be made.

<5. Detail of Operation of PND>

Figure 10:
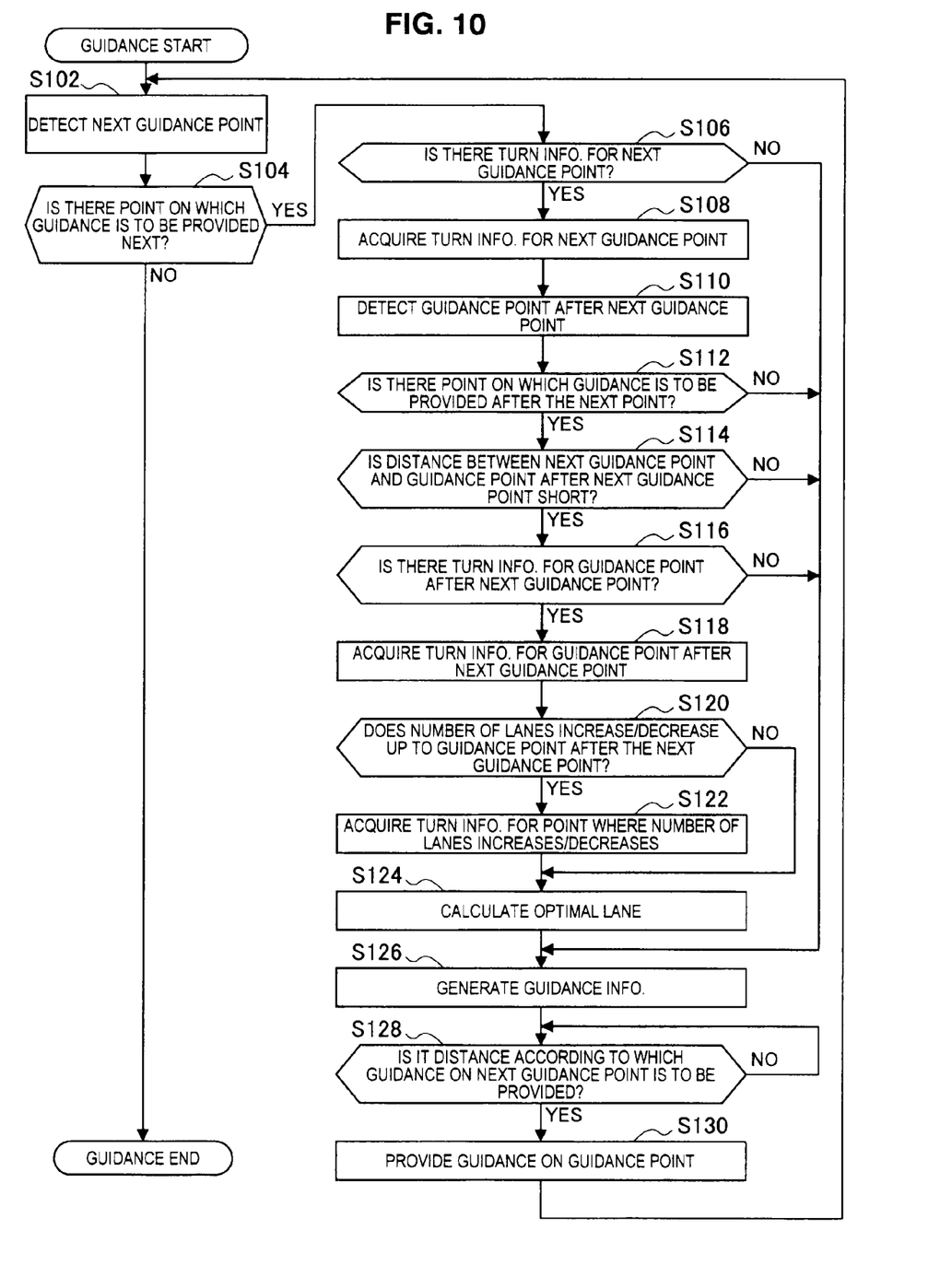
FIG. 10 is a flowchart showing a detail of operation of the PND according to the embodiment.

In the above, the functional configuration of the PND 110 has been explained. Next, a detail of operation of the PND 100 according to the present embodiment will be explained with reference to FIG. 10. FIG. 10 is a flowchart showing the detail of operation of the PND 100 according to the present embodiment. As shown in FIG. 10, first, the detection unit 104 detects the next guidance point (S102). Then, it is determined whether or not there is a point on which guidance is to be provided next (S104).

In the step S104, when it is determined that there is no point on which guidance is to be provided next, processing is terminated. In the step S104, when there is a point on which guidance is to be provided next, it is determined whether or not there is turn information for the next guidance point (S106). In the step S106, "there is turn information for the next guidance point" means that the next guidance point and the turn information on the corresponding guidance point are stored in such a manner that the next guidance point and the turn information on the corresponding guidance point are associated with each other.

In the step S106, when it is determined that there is turn information for the next guidance point, the turn information for the next guidance point is acquired (S108). In the step S106, when it is determined there is no turn information for the next guidance point, normal navigation guidance processing after the step S126 is performed, because information on the optimal lane can not be calculated.

In the step S108, after the turn information for the next guidance point has been acquired, the detection unit 104 detects a guidance point after the next guidance point (S110). Then, it is determined whether or not there is a point on which guidance is to be provided after the next point (S112). In step S112, when it is determined that there is a point on which guidance is to be provided after the next point, the detection unit 104 determines whether or not a distance between the next guidance point and the guidance point after the next guidance point is short (S114). In the step S114, when it is determined that the distance between the next guidance point and the guidance point after the next guidance point is short, it is determined whether or not there is turn information for the guidance point after the next guidance point (S116).

When there is no point on which guidance is to be provided after the next point in the step S112, when the distance between the next guidance point and the guidance point after the next guidance point is long in the step S114, or when there is no turn information for the guidance point after the next guidance point in the step S116, processing after the step S126 is performed.

And when it is determined that there is turn information for the guidance point after the next guidance point in the step S116, the turn information for the guidance point after the next guidance point is acquired (S118). Next, it is determined whether or not the number of lanes increases/decreases up to the guidance point after the next guidance point (S120). In the step S120, when it is determined that the number of lanes increases/decreases up to the guidance point after the next guidance point, turn information for the point where the number of lanes increases/decreases is acquired (S122).

Then, the decision unit 106 calculates the optimal lane based on the turn information for the next guidance point, which was acquired in the step S108, and the turn information for the guidance point after the next guidance point, which was acquired in the step S118, or the turn information for the point where the number of lanes increases/decreases, which was acquired in the step S122 (S124).

Then, guidance information indicating the optimal lane calculated in the step S124 is generated (S126). In the step S126, when the turn information for the guidance point could not be acquired, guidance information proving guidance on a normal right/left-turn is generated.

Then, it is determined whether or not it is a distance according to which guidance on the next guidance point is to be provided (S128). In the step S128, when it is determined that it is a distance according to which guidance on the next guidance point is provided, the guidance on the next guidance point is provided (S130), and processing after the step S102 is repeatedly performed.

In the above, the detail of operation of the PND 100 has been explained. With the processing above, it becomes possible for the PND 100 to provide guidance on the optimal lane in case of successive intersection points or junctions each including multiple lanes.

It should be understood by those skilled in the art that various modifications, combinations, sub-combinations and alterations may occur depending on design requirements and other factors insofar as they are within the scope of the appended claims or the equivalents thereof.

For example, respective steps included in processing of a navigation apparatus such as the PND 100 described in the present specification are not necessarily processed in chronological order in accordance with the flowchart. For example, the respective steps included in processing of a navigation apparatus such as the PND 100 may be processed in different order from the flowchart, or may be processed in a parallel manner.

Further, there can be also produced a computer program for causing hardware such as a CPU, a ROM, and a RAM, which is built in a navigation apparatus such as the PND 100, to fulfill the function equal to that in each arrangement of the navigation apparatus above. Further, there is also provided a storage medium for storing the computer program.

The present application contains subject matter related to that disclosed in Japanese Priority Patent Application JP 2010-017358 filed in the Japan Patent Office on Jan. 28, 2010, the entire content of which is hereby incorporated by reference.

What is claimed is:

1. A navigation apparatus comprising:
a storage unit that stores vehicle lane information for a guidance point, including right/left-turn information for each vehicle lane at a guidance point, the left/right-turn information for each vehicle lane being expressed by bit width of the number of vehicle lanes;
a determination unit that determines a traveling direction of a vehicle;
a detection unit that detects whether or not there is the guidance point in the traveling direction of the vehicle; and
a decision unit that decides, when it is detected by the detection unit that there are at least two or more guidance points, a priority order of traveling vehicle-lanes at the next guidance point based on vehicle lane information for the two or more guidance points and the traveling direction of the vehicle,
wherein the decision unit decides a priority order of traveling vehicle-lanes at a first guidance point that is a guidance point in the traveling direction of the vehicle, by logical conjunction of a bit value for the first guidance point and a bit value for a second guidance point that is a farther guidance point in the traveling direction of the vehicle.

2. The navigation apparatus according to claim 1,
wherein the detection unit detects a first guidance point that is a guidance point in the traveling direction of the vehicle and a second guidance point that is a farther guidance point in the traveling direction of the vehicle, and
wherein the decision unit decides, when the first guidance point and the second guidance point are detected by the detection unit, a priority order of traveling vehicle-lanes at the first guidance point based on vehicle lane information for the first guidance point and vehicle lane information for the second guidance point.

3. The navigation apparatus according to claim 2,
wherein the detection unit detects that a distance between the first guidance point and the second guidance point is less than or equal to a predetermined threshold.

4. The navigation apparatus according to claim 1,
wherein vehicle lane addition/reduction information indicating addition/reduction of a vehicle lane in an interval from a first guidance point that is a guidance point in the traveling direction of the vehicle to a second guidance point that is a farther guidance point in the traveling direction of the vehicle is stored in the store unit, and
wherein the decision unit decides a priority order of traveling vehicle-lanes at the first guidance point, based on the vehicle lane addition/reduction information, and vehicle lane information for the first guidance point and vehicle lane information for the second guidance point.

5. The navigation apparatus according to claim 1, further comprising:
a guidance unit that provides guidance on the priority order of the traveling vehicle-lanes, decided by the decision unit, before the next guidance point is passed.

6. The navigation apparatus according to 5,
wherein the guidance unit displays an arrow indicating the traveling direction of the vehicle on the traveling vehicle-lane which is displayed on a display screen, and changes the arrow indicating the traveling direction in accordance with the priority order of the traveling vehicle-lanes, decided by the decision unit.

7. The navigation apparatus according to 6,
wherein multiple traveling vehicle-lanes are displayed on the display screen, and
wherein the guidance unit displays arrows each indicating the traveling direction of the vehicle on the multiple traveling vehicle-lanes displayed on the display screen, and displays an arrow displayed on a traveling vehicle-lane with a high priority, decided by the decision unit, in a more accentuated manner than an allow for another traveling vehicle-lane.

8. A non-transitory computer readable storage medium encoded with computer program instructions for causing a processor of a vehicle navigation system to implement a method of navigation comprising
storing vehicle lane information for a guidance point and right/left-turn information for each vehicle lane at a guidance point, the left/right-turn information for each vehicle lane being expressed by bit width of the number of vehicle lanes;
determining a traveling direction of a vehicle;
detecting whether or not there is the guidance point in the traveling direction of the vehicle; and
deciding, when it is detected that there are at least two or more guidance points, a priority order of traveling vehicle-lanes at the next guidance point based on vehicle lane information for the two or more guidance points and the traveling direction of the vehicle by logical conjunction of a bit value for the first guidance point and a bit value for a second guidance point that is a farther guidance point in the traveling direction of the vehicle.

* * * * *